(12) United States Patent
Nakayama

(10) Patent No.: US 11,691,272 B2
(45) Date of Patent: Jul. 4, 2023

(54) MOTOR DRIVE CIRCUIT FOR MOTOR AND ROBOT SYSTEM

(71) Applicant: SEIKO EPSON CORPORATION, Tokyo (JP)

(72) Inventor: Junpei Nakayama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/849,769

(22) Filed: Jun. 27, 2022

(65) Prior Publication Data

US 2022/0410377 A1   Dec. 29, 2022

(30) Foreign Application Priority Data

Jun. 29, 2021   (JP) ................................. 2021-107566

(51) Int. Cl.
  *B60K 11/02* (2006.01)
  *B25J 9/12* (2006.01)
  *B25J 9/04* (2006.01)
  *B25J 9/00* (2006.01)
  *H02P 27/06* (2006.01)

(52) U.S. Cl.
  CPC ............. *B25J 9/126* (2013.01); *B25J 9/0048* (2013.01); *B25J 9/042* (2013.01); *H02P 27/06* (2013.01)

(58) Field of Classification Search
  CPC ..................................................... H02P 27/06
  See application file for complete search history.

(56) References Cited

U.S. PATENT DOCUMENTS

| | | | |
|---|---|---|---|
| 2001/0017238 A1* | 8/2001 | Tajima | ..................... B66B 1/30 187/290 |
| 2004/0245951 A1 | 12/2004 | Yamada et al. | |
| 2012/0130576 A1* | 5/2012 | Sugiyama | ............... B60L 15/00 903/903 |
| 2018/0087292 A1* | 3/2018 | Kojima | ................. E05B 47/023 |

FOREIGN PATENT DOCUMENTS

| | | |
|---|---|---|
| JP | S6260483 A | 3/1987 |
| JP | H033697 A | 1/1991 |
| JP | H0336974 A | 2/1991 |
| JP | 2001320830 A | 11/2001 |
| JP | 2003199203 A | 7/2003 |
| JP | 2004364462 A | 12/2004 |
| JP | 2018098875 A | 6/2018 |
| JP | 2020058005 A | 4/2020 |

* cited by examiner

*Primary Examiner* — Muhammad S Islam
(74) *Attorney, Agent, or Firm* — Gang Yu

(57) ABSTRACT

A motor drive circuit for a robot includes a switching unit switching among a normal state in which regenerative power is supplied to a regenerative capacitor, a first state in which a voltage is applied to a first resistor, and a second state in which a voltage is applied to the first resistor and a second resistor based on a detection result of a detection unit, wherein the switching unit switches to the first state when the voltage applied to the regenerative capacitor detected in the detection unit is equal to or larger than a first threshold in the normal state, and switches to the second state when the voltage applied to the first resistor is equal to or larger than a second threshold larger than the first threshold in the first state.

7 Claims, 8 Drawing Sheets

MOTOR DRIVE CIRCUIT FOR MOTOR AND ROBOT SYSTEM

The present application is based on, and claims priority from JP Application Serial Number 2021-107566, filed Jun. 29, 2021, the disclosure of which is hereby incorporated by reference herein in its entirety.

BACKGROUND

1. Technical Field

The present disclosure relates to a motor drive circuit for a robot and a robot system.

2. Related Art

Recently, in factories, due to labor cost rise and labor shortage, work manually performed in the past has been increasingly automated by various robots and robot peripherals thereof. The various robots include robot arms, motors actuating the robot arms, and motor drive circuits driving the motors. The motor drive circuits include e.g. a circuit described in JP-A-3-036974.

JP-A-3-036974 discloses a circuit including a capacitor, a resistor for regenerative power discharge, a transistor for discharge. In the circuit, a terminal voltage of the capacitor is detected and continuity and discontinuity of the transistor for discharge is controlled according to the detection result, and thereby, regenerative power is discharged.

When the power supply voltage largely fluctuates or lightning strikes, the power supply voltage may be excessively higher. In this case, the resistor for regenerative power discharge may excessively generate heat and be damaged by the heat depending on the current flowing in the resistor for regenerative power discharge.

SUMMARY

The present disclosure is achieved to solve at least a part of the above described problem and can be realized by the following configurations.

A motor drive circuit for a robot according to an aspect of the present disclosure includes an input terminal coupled to a power supply, to which power from the power supply is input, an output terminal outputting the power to a motor actuating the robot arm, a regenerative capacitor placed between the input terminal and the output terminal and storing regenerative power from the motor, a first resistor provided in parallel to the regenerative capacitor, a second resistor provided in parallel to the first resistor, a detection unit detecting a voltage applied to the regenerative capacitor and a voltage applied to the first resistor, and a switching unit switching among a normal state in which the regenerative power is supplied to the regenerative capacitor, a first state in which a voltage is applied to the first resistor, and a second state in which a voltage is applied to the first resistor and the second resistor based on a detection result of the detection unit, wherein the switching unit switches to the first state when the voltage applied to the regenerative capacitor detected in the detection unit is equal to or larger than a first threshold in the normal state, and switches to the second state when the voltage applied to the first resistor is equal to or larger than a second threshold larger than the first threshold in the first state.

A robot system according to an aspect of the present disclosure includes a robot arm, a motor driving the robot arm, and a motor drive circuit for a robot supplying power to the motor, the motor drive circuit for a robot includes an input terminal coupled to a power supply, to which power from the power supply is input, an output terminal outputting the power to a motor actuating the robot arm, a regenerative capacitor placed between the input terminal and the output terminal and storing regenerative power from the motor, a first resistor provided in parallel to the regenerative capacitor, a second resistor provided in parallel to the first resistor, a detection unit detecting a voltage applied to the regenerative capacitor and a voltage applied to the first resistor, and a switching unit switching among a normal state in which the regenerative power is supplied to the regenerative capacitor, a first state in which a voltage is applied to the first resistor, and a second state in which a voltage is applied to the first resistor and the second resistor based on a detection result of the detection unit, wherein the switching unit switches to the first state when the voltage applied to the regenerative capacitor detected in the detection unit is equal to or larger than a first threshold in the normal state, and switches to the second state when the voltage applied to the first resistor is equal to or larger than a second threshold larger than the first threshold in the first state.

DESCRIPTION OF EXEMPLARY EMBODIMENTS

As below, a motor drive circuit for a robot and a robot system according to the present disclosure will be explained in detail based on preferred embodiments shown in the accompanying drawings.

1. First Embodiment

Figure 1:
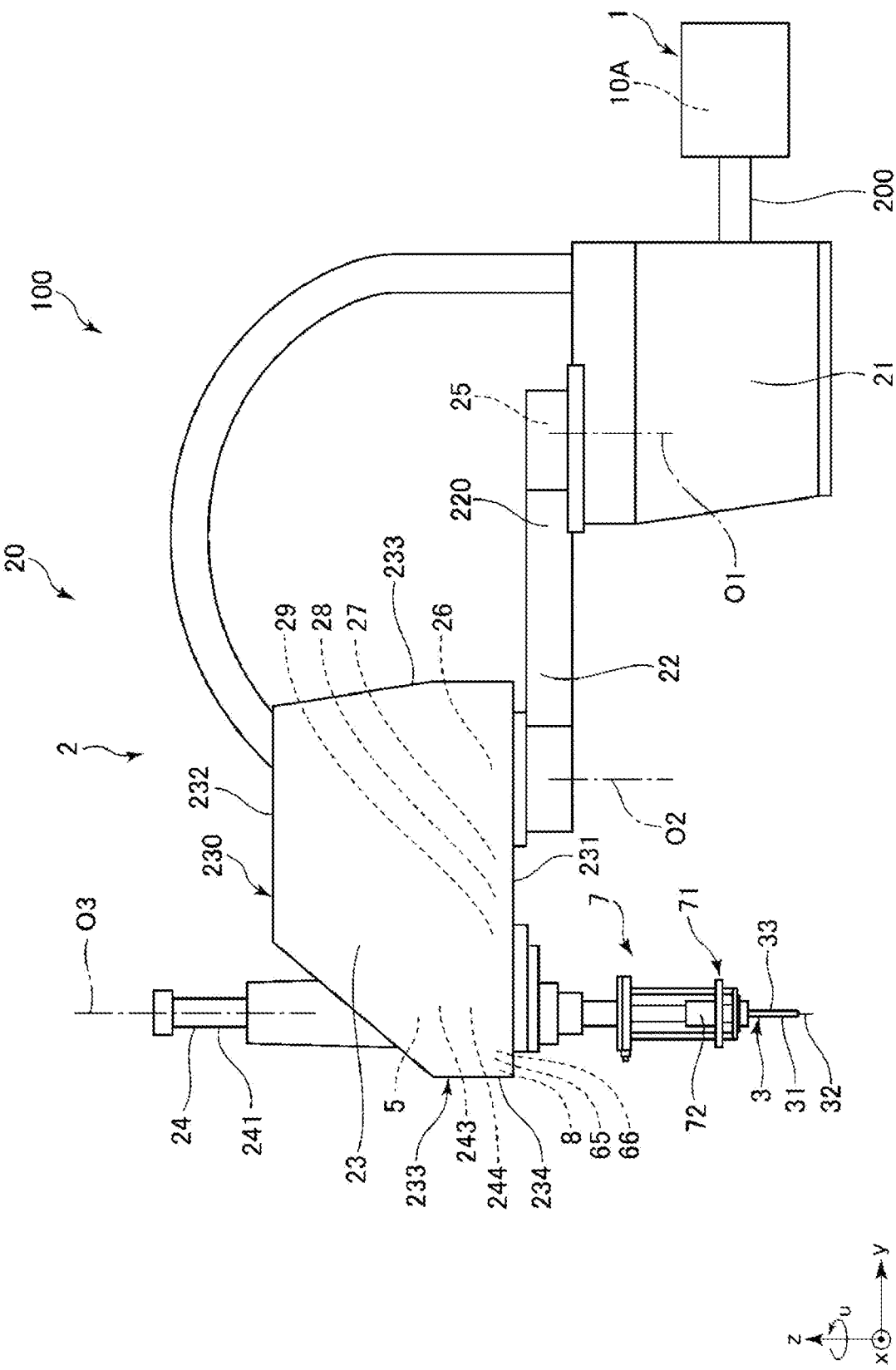
FIG. 1 is a side view showing a first embodiment of a robot system according to the present disclosure.
Figure 2:
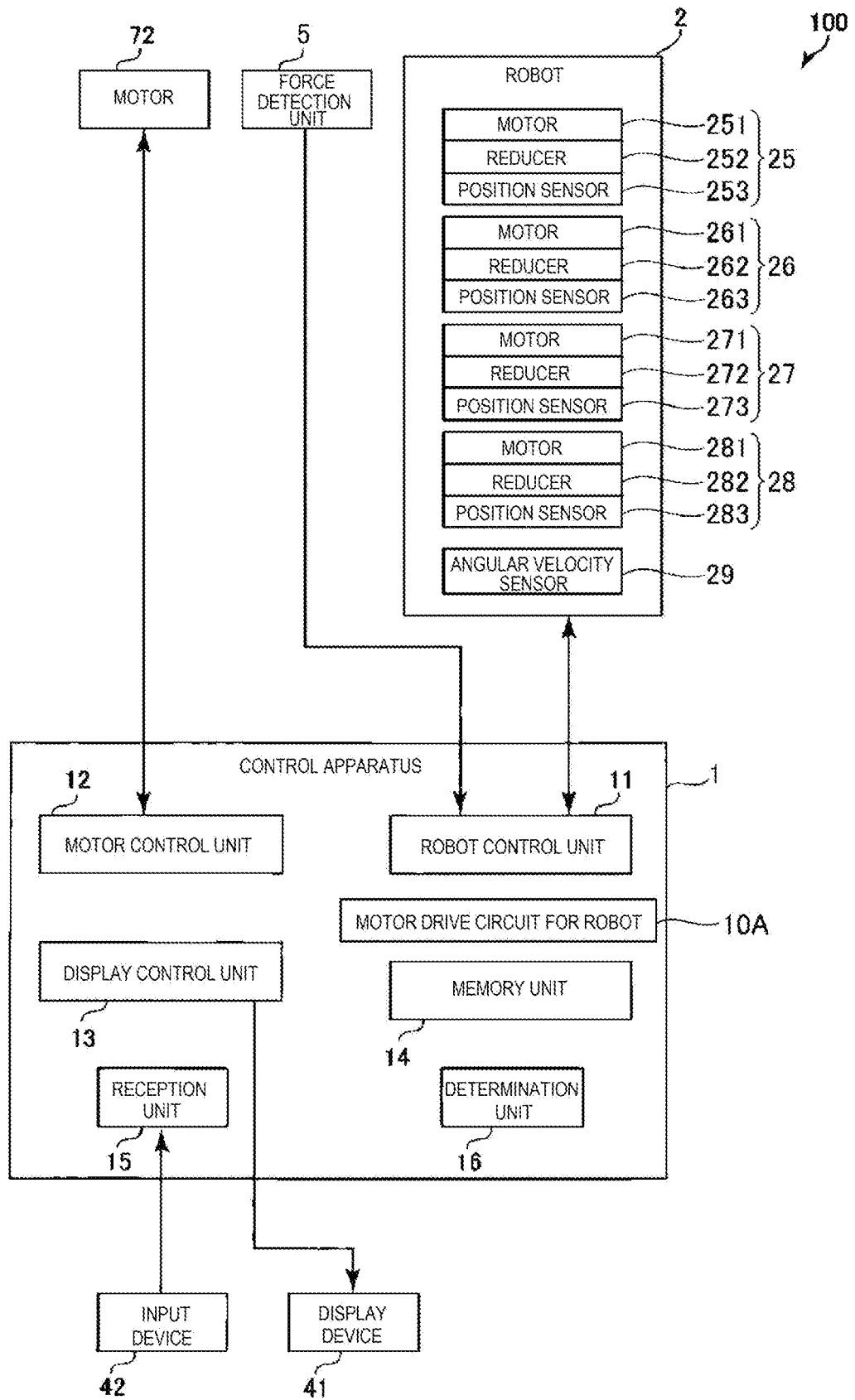
FIG. 2 is a block diagram of the robot system shown in FIG. 1.
Figure 3:
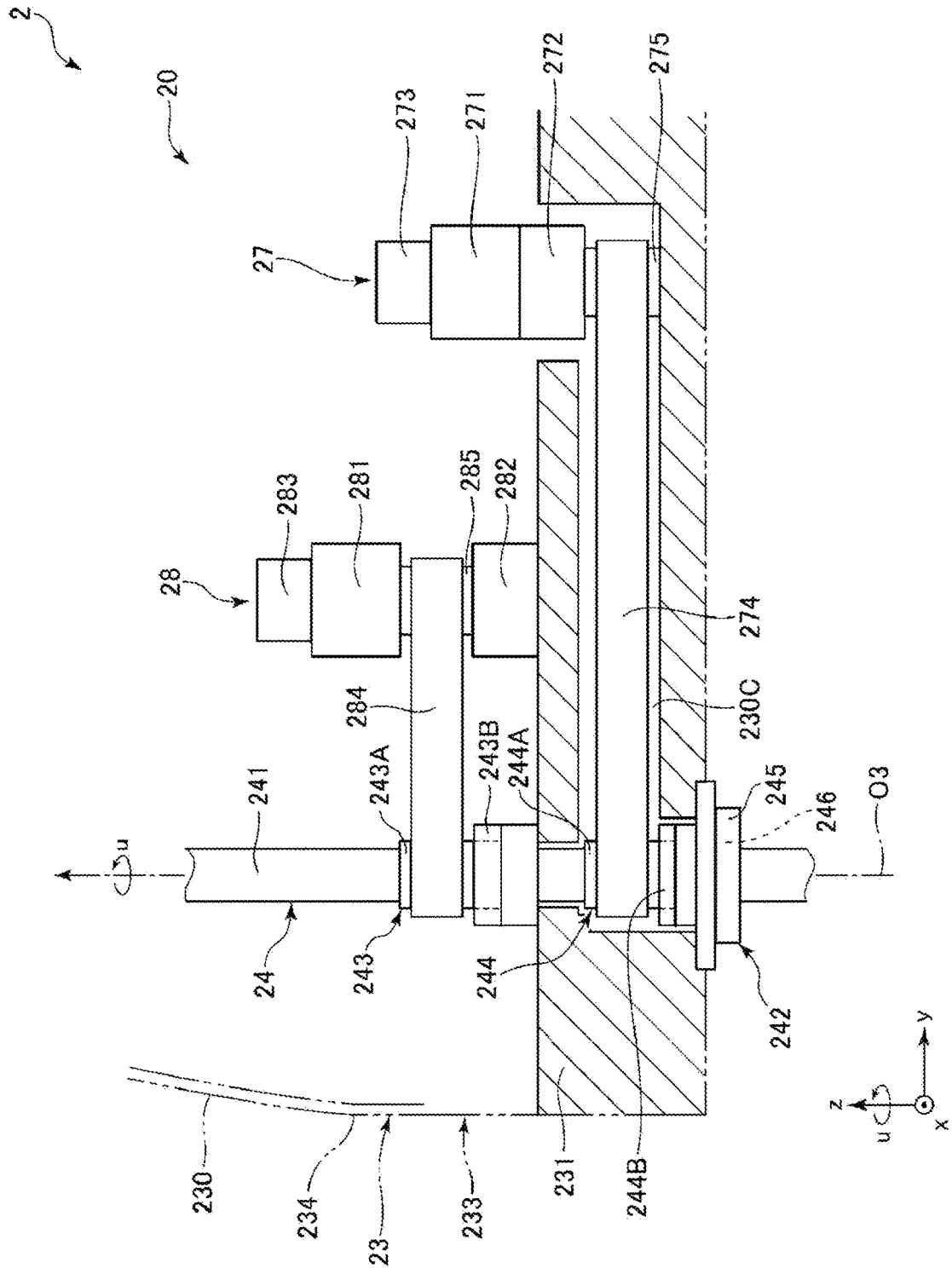
FIG. 3 is a partially sectional view showing an interior of a second arm of a robot arm shown in FIG. 1.
Figure 4:
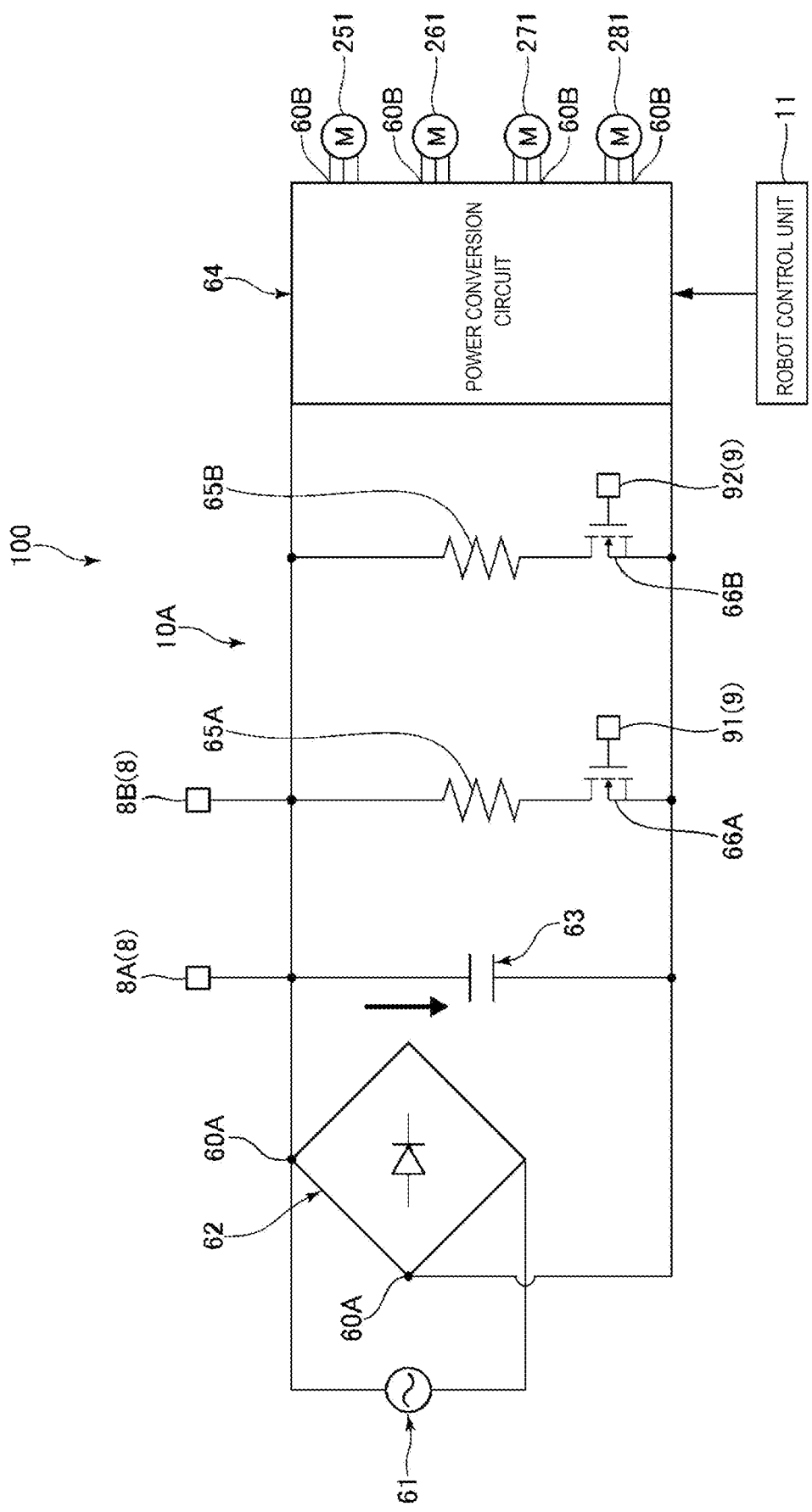
FIG. 4 is a circuit diagram of the robot system shown in FIG. 1 showing a normal state.
Figure 5:
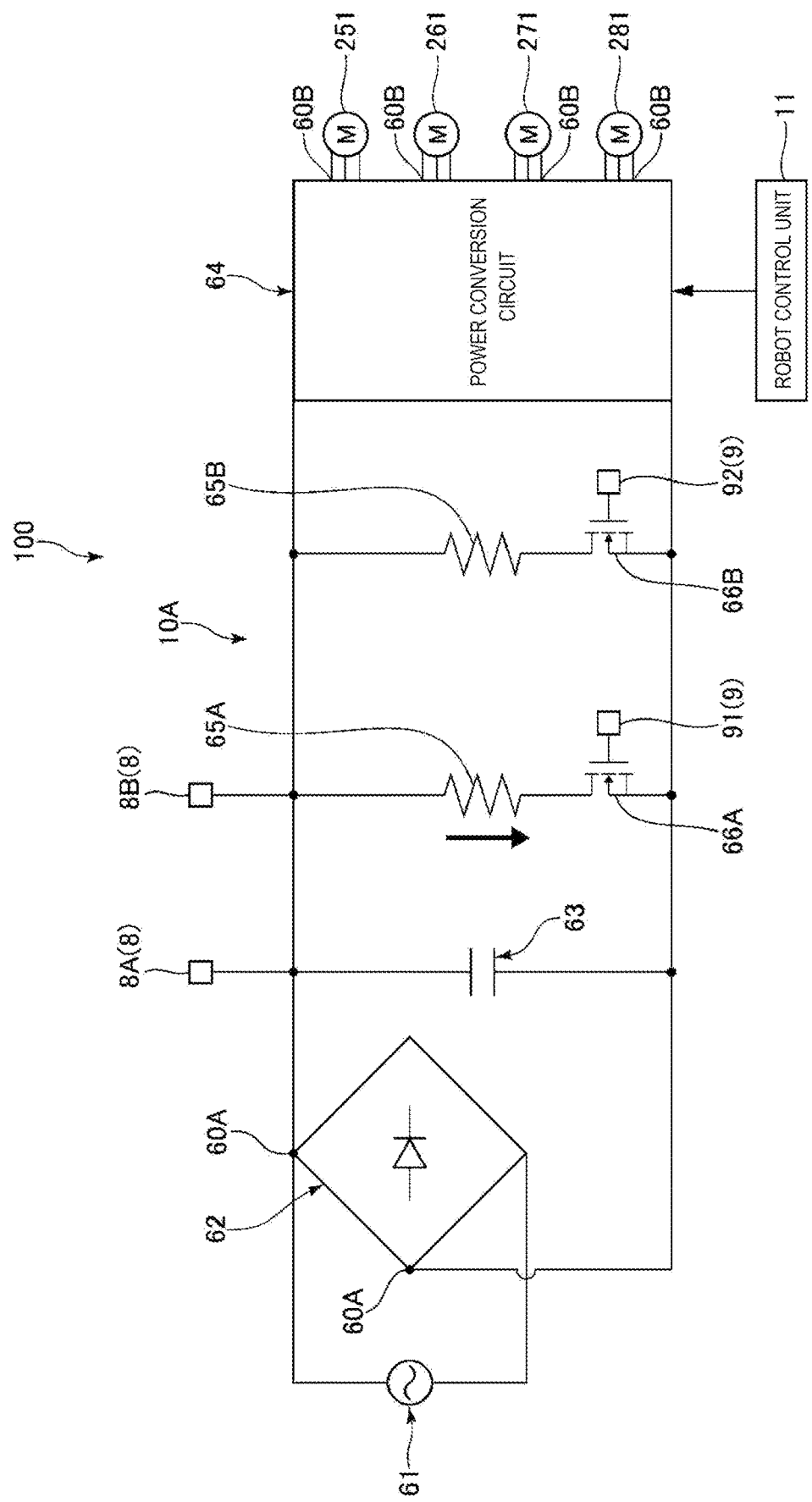
FIG. 5 is a circuit diagram of the robot system shown in FIG. 1 showing a first state.
Figure 6:
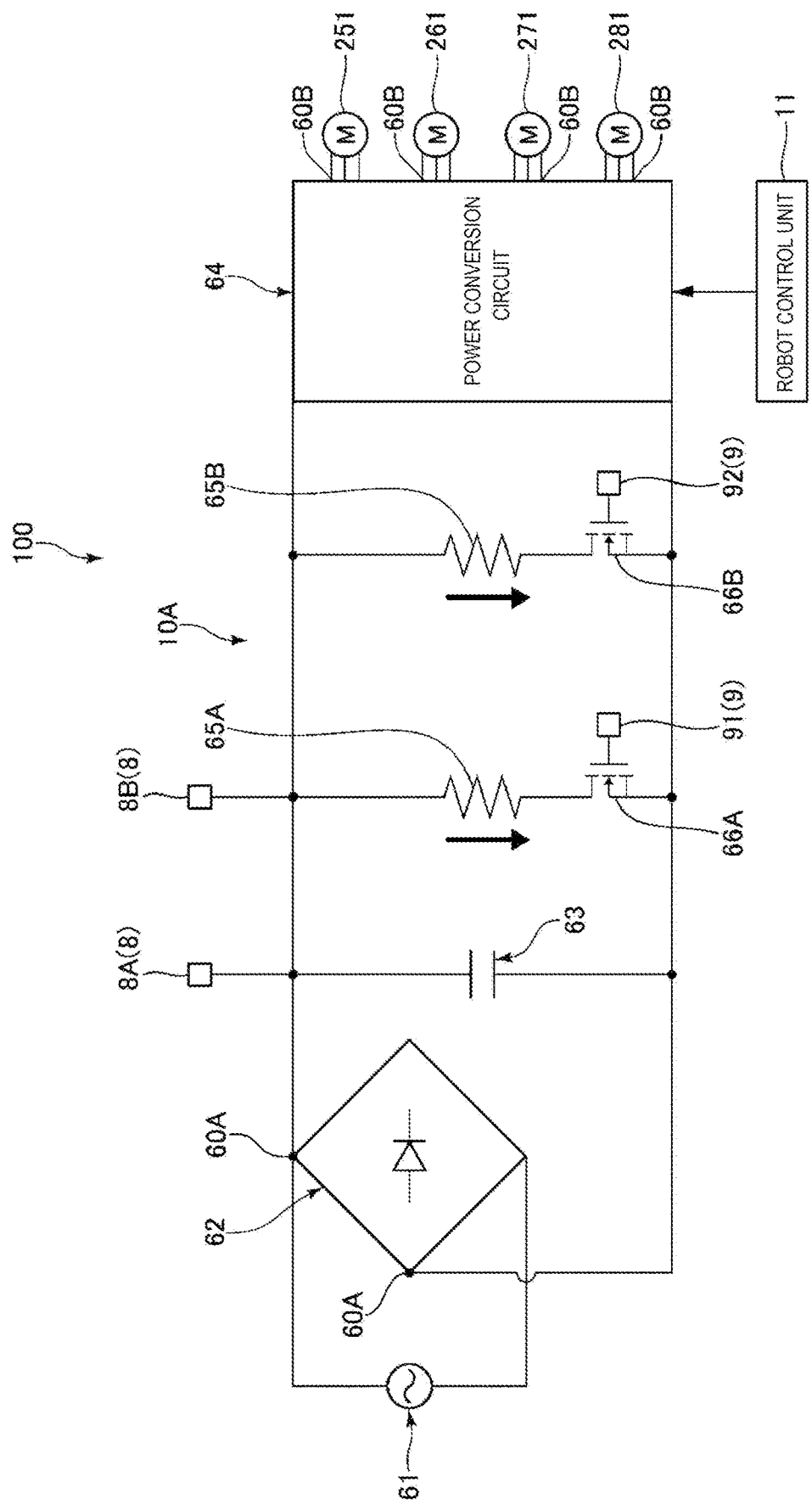
FIG. 6 is a circuit diagram of the robot system shown in FIG. 1 showing a second state.
Figure 7:
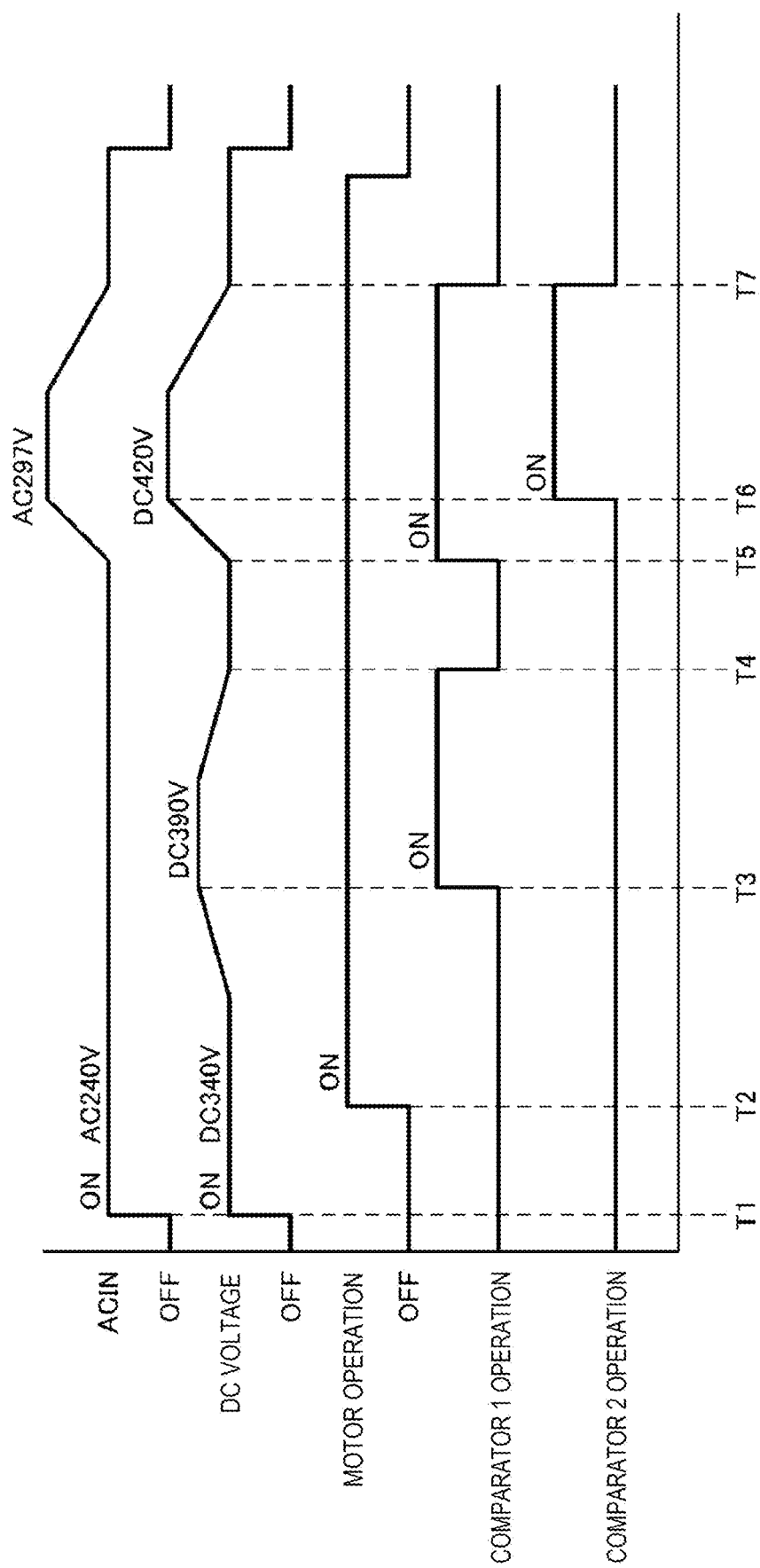
FIG. 7 is a timing chart showing actuation times of a switching unit of the robot system shown in FIG. 1.
Figure 8:
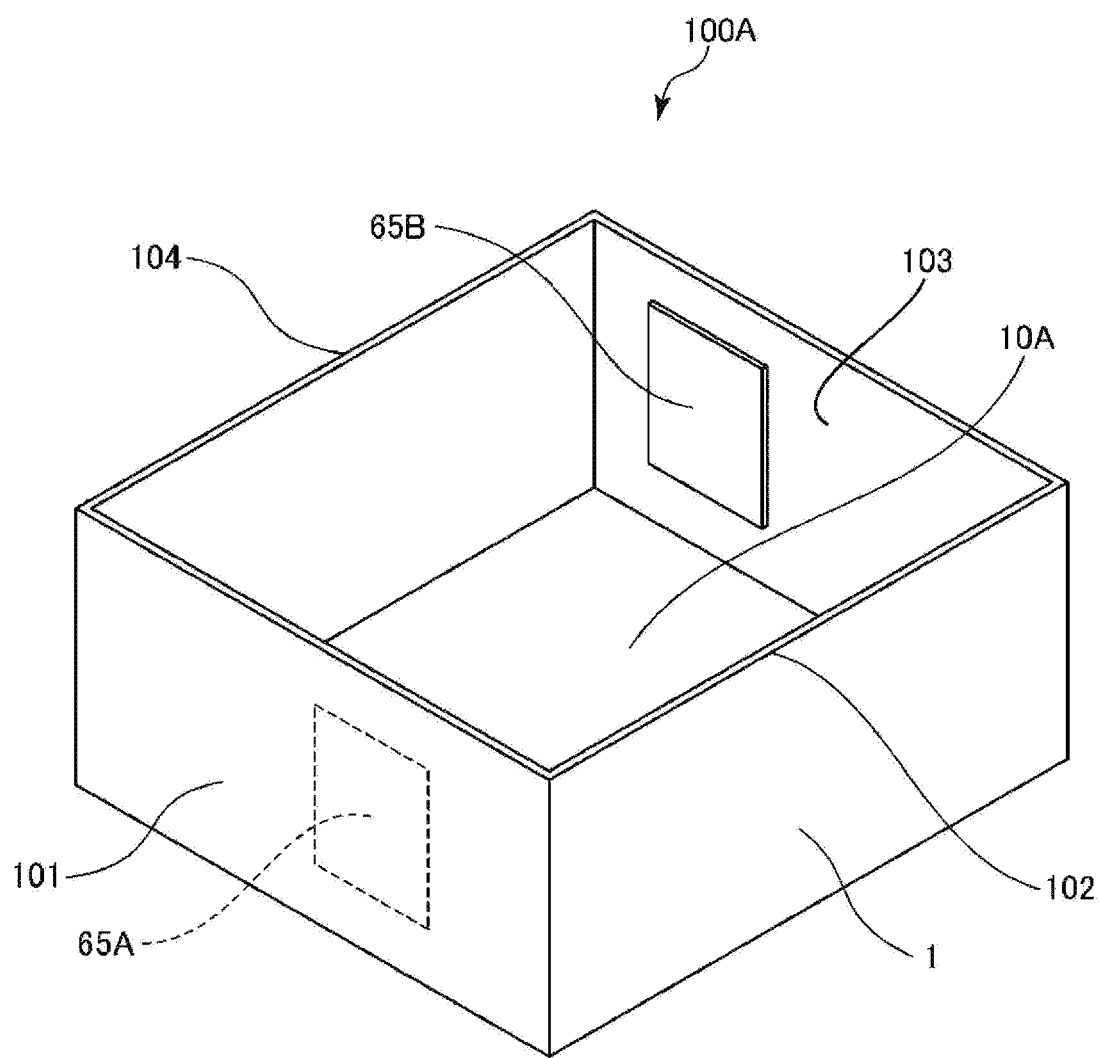
FIG. 8 is a schematic perspective view showing an interior of a control apparatus of the robot system shown in FIG. 1.

FIG. 1 is a side view showing a first embodiment of a robot system according to the present disclosure. FIG. 2 is a block diagram of the robot system shown in FIG. 1. FIG. 3 is a partially sectional view showing an interior of a second arm of a robot arm shown in FIG. 1. FIG. 4 is a circuit diagram of the robot system shown in FIG. 1 showing a normal state. FIG. 5 is a circuit diagram of the robot system shown in FIG. 1 showing a first state. FIG. 6 is a circuit diagram of the robot system shown in FIG. 1 showing a second state. FIG. 7 is a timing chart showing actuation times of a switching unit of the robot system shown in FIG. 1. FIG. 8 is a schematic perspective view showing an interior of a control apparatus of the robot system shown in FIG. 1.

In FIGS. 1 and 3, for convenience of explanation, an x-axis, a y-axis, a z-axis are shown as three axes orthogonal to one another. Hereinafter, directions parallel to the x-axis are also referred to as "x-axis directions", directions parallel to the y-axis are also referred to as "y-axis directions", and directions parallel to the z-axis are also referred to as "z-axis directions". Further, hereinafter, head sides of the respective arrows are referred to as "+ (plus)" and the tail sides are referred to as "− (minus)", a direction parallel to the +x-axis direction is also referred to as "+x-axis direction", a direction parallel to the −x-axis direction is also referred to as "−x-axis direction", a direction parallel to the +y-axis direction is also referred to as "+y-axis direction", a direction parallel to the −y-axis direction is also referred to as "−y-axis direction", a direction parallel to the +z-axis direction is also referred to as "+z-axis direction", and a direction parallel to the −z-axis direction is also referred to as "−z-axis direction". Furthermore, directions around the z-axis and directions around an axis parallel to the z-axis are also referred to as "u-axis directions".

Hereinafter, for convenience of explanation, the +z-axis direction in FIG. 1, i.e., the upside is also referred to as "upper" or "above" and the −z-axis direction, i.e., the downside is also referred to as "lower" or "below". Further, regarding a robot arm 20, a base 21 side in FIG. 1 is referred to as "proximal end" and the opposite side thereto, i.e., an end effector 7 side is referred to as "distal end". Furthermore, the z-axis directions in FIG. 1, i.e., upward and downward directions are referred to as "vertical directions" and the x-axis directions and the y-axis directions, i.e., leftward and rightward directions are referred to as "horizontal directions".

A robot system 100 shown in FIGS. 1 and 2 is a system used for work e.g. holding, transport, assembly, inspection, etc. of workpieces of electronic components and electronic apparatuses and the like. The robot system 100 includes a control apparatus 1, a robot 2, an end effector 7, a display device 41, and an input device 42. Further, a motor drive circuit for a robot 10A according to the present disclosure is provided within the control apparatus 1.

Furthermore, the control apparatus 1 is placed in a position different from that of the robot 2, i.e., outside of the robot 2. In the illustrated configuration, the robot 2 and the control apparatus 1 are electrically coupled (hereinafter, also simply referred to as "coupled") by a cable 200, however, not limited to that. The cable 200 may be omitted and wireless communications may be made. That is, the robot 2 and the control apparatus 1 are coupled by wired communications or wireless communications.

In the illustrated configuration, the robot 2 is a horizontal articulated robot, i.e., a scalar robot.

As shown in FIGS. 1 to 3, the robot 2 includes a base 21, a first arm 22, a second arm 23, a third arm 24 as a working head, and a force detection unit 5. The first arm 22, the second arm 23, and the third arm 24 form the robot arm 20.

The robot 2 includes a drive unit 25 rotating the first arm 22 relative to the base 21, a drive unit 26 rotating the second arm 23 relative to the first arm 22, a u drive unit 27 rotating a shaft 241 of the third arm 24 relative to the second arm 23, a z drive unit 28 moving the shaft 241 in the z-axis directions relative to the second arm 23, and an angular velocity sensor 29 shown in FIG. 2.

As shown in FIGS. 1 and 2, the drive unit 25 is provided within a housing 220 of the first arm 22 and has a motor 251 generating a drive force, a reducer 252 reducing the drive force of the motor 251, and a position sensor 253 detecting the rotation angle of a rotation shaft of the motor 251 or the reducer 252.

The drive unit 26 is provided within a housing 230 of the second arm 23 and has a motor 261 generating a drive force, a reducer 262 reducing the drive force of the motor 261, and a position sensor 263 detecting the rotation angle of a rotation shaft of the motor 261 or the reducer 262.

The u drive unit 27 is provided within the housing 230 of the second arm 23 and has a motor 271 generating a drive force, a reducer 272 reducing the drive force of the motor 271, and a position sensor 273 detecting the rotation angle of a rotation shaft of the motor 271 or the reducer 272.

The z drive unit 28 is provided within the housing 230 of the second arm 23 and has a motor 281 generating a drive force, a reducer 282 reducing the drive force of the motor 281, and a position sensor 283 detecting the rotation angle of a rotation shaft of the motor 281 or the reducer 282.

As the motor 251, the motor 261, the motor 271, and the motor 281, e.g. servo motors such as AC servo motors or DC servo motors may be used.

As the reducer 252, the reducer 262, the reducer 272, and the reducer 282, e.g. planetary gear reducers, wave gearing, or the like may be used. As the position sensor 253, the position sensor 263, the position sensor 273, and the position sensor 283 may be e.g. angle sensors.

The drive unit 25, the drive unit 26, the u drive unit 27, and the z drive unit 28 are respectively coupled to corresponding motor drivers (not shown) and controlled by a robot control unit 11 of the control apparatus 1 via the motor drivers.

As shown in FIG. 1, the angular velocity sensor 29 is provided inside of the second arm 23. Accordingly, the sensor may detect the angular velocity of the second arm 23. The control apparatus 1 controls the robot 2 based on information of the detected angular velocity.

The base 21 is fixed to e.g. a floor surface (not shown) by bolts or the like. The first arm 22 is coupled to the upper end portion of the base 21. The first arm 22 is rotatable around a first axis O1 along the vertical directions relative to the base 21. When the drive unit 25 rotating the first arm 22 drives, the first arm 22 rotates around the first axis O1 relative to the base 21 within a horizontal plane. Further, an amount of rotation of the first arm 22 relative to the base 21 may be detected by the position sensor 253.

The second arm 23 is coupled to the distal end portion of the first arm 22. The second arm 23 is rotatable around a second axis O2 along the vertical directions relative to the first arm 22. The axial direction of the first axis O1 and the axial direction of the second axis O2 are the same. That is, the second axis O2 is parallel to the first axis O1. When the drive unit 26 rotating the second arm 23 drives, the second arm 23 rotates around the second axis O2 relative to the first arm 22 within a horizontal plane. The driving of the second arm 23 relative to the first arm 22, specifically, an amount of rotation may be detected by the position sensor 263.

The second arm 23 has the housing 230 with a base portion 231, a top plate 232, and four side walls 233 coupling these as a plurality of wall portions. Inside of the housing 230, i.e., on the base portion 231, the drive unit 26, the u drive unit 27, and the z drive unit 28 are sequentially arranged from the +y-axis side.

As shown in FIG. 3, the base portion 231 is a bottom portion of the second arm 23 and has a recessed portion 230C in which the u drive unit 27 is placed. A part of the recessed portion 230C at the −z-axis side opens toward the −z-axis side, a rotation supporting member 242 is embedded in the opened portion and the shaft 241 is inserted therethrough.

The third arm 24 is placed in the distal end portion of the second arm 23. The third arm 24 has the shaft 241 and the rotation supporting member 242 rotatably supporting the shaft 241.

The shaft 241 is rotatable around a third axis O3 along the vertical directions relative to the second arm 23 and movable in the upward and downward directions (elevatable). The shaft 241 is an arm at the most distal end of the robot arm 20.

In the middle of the shaft 241 in the longitudinal direction, a ball screw nut 243 and a spline nut 244 are placed and the shaft 241 is supported by the nuts. These ball screw nut 243 and spline nut 244 are sequentially placed apart from the +z-axis side.

The ball screw nut 243 has an inner ring 243A and an outer ring 243B coaxially placed on the outer circumferential side of the inner ring 243A. A plurality of balls (not shown) are placed between these inner ring 243A and outer ring 243B, and the inner ring 243A and the outer ring 243B rotate relative to each other with movement of the balls.

The inner ring 243A has a portion exposed from the outer ring 243B and a belt 284, which will be described later, is looped over the exposed portion. Further, the inner ring 243A supports the shaft 241 movably along the z-axis directions, as will be described later, with the shaft 241 inserted therethrough. The outer ring 243B is fixed to the base portion 231.

The spline nut 244 has an inner ring 244A and an outer ring 244B coaxially placed on the outer circumferential side of the inner ring 244A. A plurality of balls (not shown) are placed between these inner ring 244A and outer ring 244B, and the inner ring 244A and the outer ring 244B rotate relative to each other with movement of the balls.

The inner ring 244A has a portion exposed from the outer ring 244B and a belt 274, which will be described later, is looped over the exposed portion. Further, the inner ring 244A supports the shaft 241 rotatably around the z-axis, i.e., in the u-axis directions with the shaft 241 inserted therethrough. The outer ring 244B is fixed to the recessed portion 230C of the base portion 231, which will be described later.

The rotation supporting member 242 is placed at the −z-axis side of the spline nut 244. The rotation supporting member 242 has an outer tube 245 and a rotating member 246 provided inside of the outer tube 245. The outer tube 245 is fixed to the base portion 231 within the housing 230 of the second arm 23. On the other hand, the rotating member 246 is fixed to the shaft 241 and supported rotatably around the z-axis, i.e., in the u-axis directions with the shaft 241 by the outer tube 245.

When the u drive unit 27 rotating the shaft 241 drives, the shaft 241 turns forward and backward, i.e., rotates around the z-axis. Further, the amount of rotation of the shaft 241 relative to the second arm 23 may be detected by the position sensor 273.

When the z drive unit 28 moving the shaft 241 in the z-axis directions drives, the shaft 241 moves upward and downward directions, i.e., in the z-axis directions. Further, the amount of movement of the shaft 241 relative to the second arm 23 in the z-axis directions may be detected by the position sensor 283.

Various end effectors are detachably coupled to the distal end portion of the shaft 241. The end effectors are not particularly limited to, but include e.g. one gripping an object to be transported, one processing an object to be processed, and one used for inspection. In the embodiment, the end effector 7 is detachably coupled. The end effector 7 will be described later in detail.

Note that, in the embodiment, the end effector 7 is not a component element of the robot 2, however, a part or all of the end effector 7 may be a component element of the robot 2. In the embodiment, the end effector 7 is not a component element of the robot arm 20, however, a part or all of the end effector 7 may be a component element of the robot arm 20.

As shown in FIG. 1, the end effector 7 has an attachment portion 71 attached to the shaft 241, a motor 72 provided in the attachment portion 71, and a screw limit gauge 3 coaxially and detachably attached to the rotation shaft of the motor 72. The end effector 7 is detachably coupled to the distal end portion of the shaft 241. Further, the center axis of the shaft 241, i.e., the third axis O3, the rotation shaft of the motor 72, and the center axis of the screw limit gauge 3 are aligned. That is, as seen from the axial direction of the third axis O3, the third axis O3, the motor 72, and the screw limit gauge 3 overlap.

The screw limit gauge 3 is an example of a screw gauge and has a columnar grip portion 31, a go-side gauge 32 provided in one end part of the grip portion 31 and having a male thread formed therein, a no-go-side gauge 33 provided in the other end part of the grip portion 31 and having a male thread formed therein. Regarding the screw limit gauge 3, when the go-side gauge 32 is used, the end part of the grip portion 31 in which the no-go-side gauge 33 is provided is attached to the rotation shaft of the motor 72 and the go-side gauge 32 is placed at the distal end side. Or, when the no-go-side gauge 33 is used, the end part of the grip portion 31 in which the go-side gauge 32 is provided is attached to the rotation shaft of the motor 72 and the no-go-side gauge 33 is placed at the distal end side.

The motor 72 is not particularly limited, but e.g. a servo motor such as an AC servo motor or a DC servo motor, a stepping motor, or the like is used.

Further, the end effector 7 has an angle sensor (not shown) detecting the rotation angle of the rotation shaft of the motor 72, and the rotation angle of the rotation shaft of the motor 72 may be detected by the position sensor.

The force detection unit 5 includes e.g. a force sensor detecting a force applied to the third arm 24 or the like. The configuration of the force detection unit 5 will be described later in detail.

In the end effector 7, in comparison to a case where a power transmission mechanism including a gear and a belt intervenes between the rotation shaft of the motor 72 and the screw limit gauge 3, lowering of the rotation accuracy by backlash may be suppressed.

Note that the screw limit gauge 3 is not limited to the above described configuration, but may have e.g. a configuration using a screw limit gauge only having a go-side gauge and a screw limit gauge only having a no-go-side gauge by replacement.

Further, in the embodiment, the end effector 7 is detachable from the robot arm 20, however, not limited to that. For example, the end effector 7 may be undetachable from the robot arm 20.

As shown in FIG. 2, the control apparatus 1 includes the robot control unit 11, a motor control unit 12 (end effector control unit), a display control unit 13, a memory unit 14, a reception unit 15, and a determination unit 16, and respectively controls driving of the respective units of the robot system 100 including the robot 2, the motor 72 of the end effector 7, and the display device 41.

Further, the control apparatus 1 is configured to respectively communicate with the robot control unit 11, the motor control unit 12, the display control unit 13, the memory unit 14, the reception unit 15, and the determination unit 16. That is, the robot control unit 11, the motor control unit 12, the display control unit 13, the memory unit 14, the reception unit 15, and the determination unit 16 are connected to one another by wired or wireless communications.

To the control apparatus 1, the robot 2, the display device, 41, the input device 42, and the end effector 7 are respectively connected by wired or wireless communications.

The robot control unit 11 controls driving of the robot 2, i.e., driving of the robot arm 20 etc. The robot control unit 11 is a computer in which a program such as an OS is installed. The robot control unit 11 has e.g. a CPU as a processor, a RAM, and a ROM in which the program is stored. For example, the functions of the robot control unit 11 may be realized by the CPU executing various programs.

The motor control unit 12 controls driving of the motor 72. The motor control unit 12 is a computer in which a program such as an OS is installed. The motor control unit 12 has e.g. a CPU as a processor, a RAM, and a ROM in which the program is stored. For example, the functions of the motor control unit 12 may be realized by the CPU executing various programs.

The display control unit 13 has a function of displaying various windows, characters, etc. on the display device 41. That is, the display control unit 13 controls driving of the display device 41. For example, the functions of the display control unit 13 may be realized by a GPU or the like.

The memory unit 14 has a function of storing various kinds of information (containing data, programs, etc.) The memory unit 14 stores a control program etc. The functions of the memory unit 14 may be realized by the so-called external memory device (not shown) such as a ROM.

The reception unit 15 has a function of receiving input from the input device 42. This function of the reception unit 15 may be realized by e.g. an interface circuit. Note that, for example, when a touch panel is used, the reception unit 15 has a function as an input sensing unit sensing contact of a finger of a user with the touch panel or the like.

The display device 41 includes a monitor (not shown) including e.g. a liquid crystal display and an EL display, and has a function of displaying e.g. various images and characters including various windows.

The input device 42 includes e.g. a mouse, a keyboard, etc. Therefore, the user may give an instruction of various kinds of processing on the control apparatus 1 by operating the input device 42.

Specifically, the user may give an instruction to the control apparatus 1 by operation to click various windows displayed on the display device 41 by the mouse of the input device 42 and operation to input characters, numerals, etc. by the keyboard of the input device 42.

Note that, in the embodiment, in place of the display device 41 and the input device 42, a display input device including both the display device 41 and the input device 42 may be provided. As the display input device, e.g. a touch panel such as an electrostatic touch panel or a pressure-sensitive touch panel may be used. Or, the input device 42 may recognize sound of voice or the like.

Next, the interior of the second arm 23 is explained.

In the robot 2, as shown in FIG. 3, the u drive unit 27 rotating the third arm 24 around the z-axis, the z drive unit 28 moving the third arm 24 in the z-axis directions, the belt 274, and the belt 284 are provided within the housing 230 of the second arm 23.

As shown in FIG. 3, the u drive unit 27 has a pulley 275 in addition to the above described motor 271, reducer 272, and position sensor 273. These are placed from the +z-axis side in the order of the position sensor 273, the motor 271, the reducer 272, and the pulley 275 and fixed to the bottom part of the recessed portion 230C. The pulley 275 is fixed to the core of the reducer 272 and the rotation force of the motor 271 is reduced by the reducer 272 and transmitted to the pulley 275.

Further, the pulley 275 is coupled to the inner ring 244A of the spline nut 244 provided on the shaft 241 by the belt 274. The belt 274 is an endless belt looped over the pulley 275 and the inner ring 244A and has teeth (not shown) on the inner side, i.e., the pulley 275 and the inner ring 244A side. The teeth of the belt 274 mesh with teeth (not shown) in the exposed parts of the pulley 275 and the inner ring 244A.

In the u drive unit 27, the rotation force of the motor 271 is transmitted to the belt 274 via the reducer 272 and the pulley 275 and the belt 274 rotates. By the rotation of the belt 274, the rotation force is transmitted to the shaft 241 via the spline nut 244. The rotation force is transmitted to the shaft 241 via the inner circumferential portion of the inner ring 244A and spline grooves (not shown) of the shaft 241, and the shaft 241 may move in the u-axis directions, that is, rotate.

As shown in FIG. 3, the z drive unit 28 has a pulley 285 in addition to the above described motor 281, the reducer 282, and the position sensor 283. These are placed from the +z-axis side in the order of the position sensor 283, the motor 281, the pulley 285, and the reducer 282. The pulley 285 is fixed to the core of the reducer 282 and the rotation force of the motor 281 is reduced by the reducer 282 and transmitted to the pulley 285. Further, the reducer 282 is fixed to the base portion 231.

The pulley 285 is coupled to an exposed portion of the inner ring 243A of the ball screw nut 243 provided on the shaft 241 by the belt 284. The belt 284 is an endless belt looped over the pulley 285 and the inner ring 243A and has teeth (not shown) on the inner side, i.e., the pulley 285 and the inner ring 243A side. The teeth of the belt 284 mesh with teeth (not shown) of the pulley 285 and the inner ring 243A.

In the z drive unit 28, the rotation force of the motor 281 is transmitted to the belt 284 via the reducer 282 and the pulley 285 and the belt 284 rotates. By the rotation of the belt 284, the rotation force is transmitted to the shaft 241 via the inner ring 243A of the ball screw nut 243. The direction of the rotation force is converted by the inner circumferential portion of the inner ring 243A and ball screw grooves of the shaft 241, and the shaft 241 may move in the z-axis directions, that is, move upward and downward.

Next, the circuit diagram of the robot system 100 is explained.

As shown in FIG. 4, the robot system 100 has the motor drive circuit for a robot 10A. The motor drive circuit for a robot 10A has a rectifier circuit 62 electrically coupled to a power supply 61, a regenerative capacitor 63 electrically coupled to the downstream of the rectifier circuit 62, a regenerative resistor 65A parallel-coupled to the downstream of the regenerative capacitor 63, a regenerative resistor 65B parallel-coupled to the downstream of the regenerative resistor 65A, and a power converter circuit 64 parallel-coupled to the downstream of the regenerative resistor 65B.

The power supply 61 is an alternating-current power supply. The rectifier circuit 62 is a bridge rectifier circuit using a diode and rectifies the voltage or the current output from the power supply 61. The regenerative capacitor 63 is a smoothing capacitor and smooths the voltage output from the rectifier circuit 62. The power converter circuit 64 has a plurality of inverters, i.e., inverters in the number corresponding to the number of the motors 251 to 281 as the drive sources. The respective inverters respectively convert the direct-current voltage output from the regenerative capacitor 63 into alternating-current voltages, and respectively selectively supply the voltages to the corresponding motors 251 to 281. Note that the magnitude and timing of the power respectively output from the power converter circuit 64 to the motors 251 to 281 are set by the robot control unit 11.

The output terminal of the rectifier circuit 62 is an input terminal 60A. Terminals output from the power converter circuit 64 to the motors 251 to 281 are respectively output terminals 60B.

The regenerative resistor 65A and the regenerative resistor 65B are coupled between the regenerative capacitor 63 and the power converter circuit 64 in parallel to each other. The regenerative resistor 65A and the regenerative resistor 65B convert regenerative power as regenerative energy generated in the motors 251 to 281 into heat to use, for example, when energization is stopped for decelerating the arms 22 to 24, that is, when regeneration of the motors 251 to 281 is performed. Regeneration refers to activation of the drive sources of the motors 251 to 281 to generate power from the drive sources, i.e., activation of the drive sources as power generators.

For example, when the first arm 22 is driven, the robot control unit 11 controls the power converter circuit 64 by the power from the power supply 61 and energizes the motor 251 with predetermined timing and amount. On the other hand, when driving of the first arm 22 is stopped, the robot control unit 11 controls the power converter circuit 64 to stop the energization to the motor 251. Power is generated in the motor 251 and the power is stored in the regenerative capacitor 63. Then, the residual power exceeding the capacity of the regenerative capacitor 63 is converted into heat in the regenerative resistor 65A and the regenerative resistor 65B, and the regenerative resistors 65 generate heat. Note that the robot control unit 11 performs the same control as that described above on the motors 261 to 281 when driving and stopping the second arm 23 and the third arm.

The regenerative resistor 65A and the regenerative resistor 65B are placed within a housing (not shown). The housing is formed using e.g. a material having good heat conductivity such as a metal material. When the regenerative resistor 65A and the regenerative resistor 65B inside generate heat and the temperature rises, the heat is transmitted to the housing via a substrate (not shown).

A switch 66A is series-coupled to the regenerative resistor 65A and a switch 66B is series-coupled to the regenerative resistor 65B. When the switch 66A is ON, power is supplied to the regenerative resistor 65A and, when the switch 66A is OFF, power is not supplied to the regenerative resistor 65A. When the switch 66B is ON, power is supplied to the regenerative resistor 65B and, when the switch 66B is OFF, power is not supplied to the regenerative resistor 65B.

A first detection unit 8A detects the potential of the regenerative capacitor 63. A signal relating to the detection result detected by the first detection unit 8A is input to a comparator 91. A second detection unit 8B detects the potential of the regenerative resistor 65B. A signal relating to the detection result detected by the second detection unit 8B is input to a comparator 92. The first detection unit 8A and the second detection unit 8B form a detection unit 8.

The comparator 91 compares the detection result of the first detection unit 8A, i.e., the potential of the regenerative capacitor 63 and a first threshold and outputs a signal according to the comparison result to the switch 66A. That is, when determining that the potential of the regenerative capacitor 63 is larger than the first threshold, the comparator 91 transmits a signal to turn on the switch 66A to the switch 66A. On the other hand, when determining that the potential of the regenerative capacitor 63 is equal to or smaller than the first threshold, the comparator 91 transmits a signal to turn off the switch 66A to the switch 66A.

The comparator 92 compares the detection result of the second detection unit 8B, i.e., the potential of the regenerative resistor 65A and a second threshold and outputs a signal according to the comparison result to the switch 66B. That is, when determining that the potential of the regenerative resistor 65A is larger than the second threshold, the comparator 92 transmits a signal to turn on the switch 66B to the switch 66B. On the other hand, when determining that the potential of the regenerative resistor 65A is equal to or smaller than the second threshold, the comparator 92 transmits a signal to turn off the switch 66B to the switch 66B.

These comparator 91 and comparator 92 switch among a normal state, a first state, and a second state based on the detection result of the detection unit 8.

As shown in FIG. 4, the normal state is a state in which the switch 66A and the switch 66B are off and the regenerative power generated in the motors 251 to 281 is stored in the regenerative capacitor 63.

The first state is a state to which the normal state is switched when the voltage applied to the regenerative capacitor 63 detected by the first detection unit 8A is equal to or larger than the first threshold. As shown in FIG. 5, in the first state, the switch 66A is on and the switch 66B is off. In the first state, the regenerative power generated in the motors 251 to 281 is applied to the regenerative resistor 65A. Thereby, even when the capacity of the regenerative capacitor 63 becomes full, the voltage is applied to the regenerative resistor 65A and the regenerative resistor 65A generates heat and is discharged.

The second state is a state to which the first state is switched when the voltage applied to the regenerative resistor 65B detected by the second detection unit 8B is equal to or larger than the second threshold. As shown in FIG. 6, in the second state, the switch 66A and the switch 66B are on. In the second state, the regenerative power generated in the motors 251 to 281 is applied to the regenerative resistor 65A and the regenerative resistor 65B. Thereby, the voltage is applied to the regenerative resistor 65A and the regenerative resistor 65B and the regenerative resistor 65A and the regenerative resistor 65B generate heat and are discharged.

As described above, the motor drive circuit for a robot 10A includes the input terminal 60A coupled to the power supply 61, to which power from the power supply 61 is input, the output terminals 60B outputting the power to the motors 251 to 281 actuating the robot arm 10, the regenerative capacitor 63 placed between the input terminal 60A and the output terminals 60B and storing the regenerative power from the motors 251 to 281, the regenerative resistor 65A as a first resistor provided in parallel to the regenerative capacitor 63, the regenerative resistor 65B as a second resistor provided in parallel to the regenerative resistor 65A, the detection unit 8 detecting the voltage applied to the regenerative capacitor 63 and the voltage applied to the regenerative resistor 65A, and a switching unit 9 switching among the normal state in which the regenerative power is supplied to the regenerative capacitor 63, the first state in which the voltage is applied to the regenerative resistor 65A, and the second state in which the voltage is applied to the regenerative resistor 65A and the regenerative resistor 65B based on the detection result of the detection unit 8. Further, the switching unit 9 switches to the first state when the voltage applied to the regenerative capacitor 63 detected in the detection unit 8 is equal to or larger than the first threshold in the normal state and switches to the second state when the voltage applied to the regenerative resistor 65A is equal to or larger than the second threshold larger than the first threshold in the first state.

According to the configuration, when the voltage applied to the regenerative resistor 65A exceeds the second threshold, the current is distributed in the regenerative resistor 65A and the regenerative resistor 65B, and thereby, the current flowing in the regenerative resistor 65A may be reduced compared to that before the current is distributed. Generally, an amount of heat generated in a resistor is proportional to a product of a voltage applied to the resistor and a current flowing in the resistor. Therefore, excessive heat generation by the regenerative resistor 65A may be prevented or suppressed and breakage of the regenerative resistor 65A may be prevented or suppressed.

In a configuration in which a state using only the regenerative resistor 65A and a state using only the regenerative resistor 65B are switched, it is necessary to increase the resistance value of at least one of the regenerative resistor 65A and the regenerative resistor 65B, however, according to the present disclosure, it is not necessary to excessively increase the resistance value of either the regenerative resistor 65A or the regenerative resistor 65B, and the total amount of heat generation may be suppressed.

As described above, according to the present disclosure, breakage of the regenerative resistor 65A may be prevented or suppressed and the total amount of heat generation of the regenerative resistor 65A and the regenerative resistor 65B may be suppressed.

The robot system 100 according to the present disclosure includes the robot arm 10, the motors 251 to 281 driving the robot arm 10, and the motor drive circuit for a robot 10A supplying power to the motors 251 to 281. Further, the motor drive circuit for a robot 10A includes the input terminal 60A coupled to the power supply 61, to which power from the power supply 61 is input, the output terminals 60B outputting the power to the motors 251 to 281 actuating the robot arm 10, the regenerative capacitor 63 placed between the input terminal 60A and the output terminals 60B and storing the regenerative power from the motors 251 to 281, the regenerative resistor 65A as the first resistor provided in parallel to the regenerative capacitor 63, the regenerative resistor 65B as the second resistor provided in parallel to the regenerative resistor 65A, the detection unit 8 detecting the voltage applied to the regenerative capacitor 63 and the voltage applied to the regenerative resistor 65A, and the switching unit 9 switching among the normal state in which the regenerative power is supplied to the regenerative capacitor 63, the first state in which the voltage is applied to the regenerative resistor 65A, and the second state in which the voltage is applied to the regenerative resistor 65A and the regenerative resistor 65B based on the detection result of the detection unit 8. Further, the switching unit 9 switches to the first state when the voltage applied to the regenerative capacitor 63 detected in the detection unit 8 is equal to or larger than the first threshold in the normal state and switches to the second state when the voltage applied to the regenerative resistor 65A is equal to or larger than the second threshold larger than the first threshold in the first state. Thereby, the breakage of the regenerative resistor 65A may be prevented or suppressed and the total amount of heat generation of the regenerative resistor 65A and the regenerative resistor 65B may be suppressed. Therefore, the robot system 100 having high safety and reliability may be provided.

Note that the difference between the first threshold and the second threshold is preferably equal to or larger than 5 V and more preferably larger than 5 V. Thereby, switching between the first state and the second state may be performed more accurately.

Further, the regenerative capacitor 63 is coupled between the input terminal 60A and the regenerative resistor 65A as the first resistor. Thereby, in the first state, the regenerative power of the motors 251 to 281 may be discharged in the regenerative resistor 65A more effectively.

Furthermore, the regenerative resistor 65B as the second resistor is coupled between the regenerative resistor 65A as the first resistor and the output terminal 60B. Thereby, in the second state, the regenerative power of the motors 251 to 281 may be discharged in the regenerative resistor 65B more effectively.

As described above, the detection unit 8 detects the voltage of the input terminal 60A. Thereby, the voltage of the regenerative capacitor 63 may be accurately detected and an abnormality of the power supply 61 may be accurately detected.

Note that the resistance value of the regenerative resistor 65A and the resistance value of the regenerative resistor 65B may be the same or different.

When the resistance value of the regenerative resistor 65A as the first resistor and the resistance value of the regenerative resistor 65B as the second resistor are the same, the same resistors may be used and the cost may be reduced.

When the resistance value of the regenerative resistor 65B as the second resistor is smaller than the resistance value of the regenerative resistor 65A as the first resistor, the amount of heat generation of the regenerative resistor 65A that is more frequently used may be reduced as quickly as possible. Therefore, the total amount of heat generation in the regenerative resistor 65A and the regenerative resistor 65B may be suppressed.

As shown in FIG. 8, the regenerative resistor 65A and the regenerative resistor 65B are placed within the housing 100A of the control apparatus 1. The housing 100A has a nearly rectangular parallelepiped shape with a bottom plate, a top plate (not shown), a side wall portion 101, a side wall portion 102, a side wall portion 103, and a side wall portion 104. The regenerative resistor 65A and the regenerative resistor 65B are placed on the insides of opposing parts of the side wall portions. For example, the regenerative resistor 65A is placed on the side wall portion 101 and the regenerative resistor 65B is placed on the side wall portion 103. That is, the regenerative resistor 65A and the regenerative resistor 65B are placed on the opposing surfaces apart from each other not to be adjacent to each other. According to the configuration, an excessively high temperature rise within the hosing 100A due to the heat generation by the regenerative resistor 65A and the regenerative resistor 65B may be prevented or suppressed. Note that, not limited to the above described configuration, but the regenerative resistor 65A may be placed on the side wall portion 103 and the regenerative resistor 65B may be placed on the side wall portion 101. Or, one of the regenerative resistor 65A and the regenerative resistor 65B may be placed on one of the side wall portion 102 and the side wall portion 104 and the other of the regenerative resistor 65A and the regenerative resistor 65B may be placed on the other of the side wall portion 102 and the side wall portion 104.

Though not shown in the drawing, when a radiating portion such as a radiating hole or fin is provided in the housing 100A, it is preferable to place the regenerative resistor 65A more frequently used in a part having higher radiation performance and place the regenerative resistor 65B less frequently used in a part having lower radiation performance. Thereby, heat radiation of the regenerative resistor 65A and the regenerative resistor 65B may be effectively performed.

The radiation performance depends on the degree of opening of the radiation hole, i.e., the number of provided holes or the opening area, density of the radiation fin, strength of a cooling fan, or the like.

Next, times when the switching unit 9 switches among the normal state, the first state, and the second state will be explained with reference to the timing chart shown in FIG. 7.

First, at time T1, power supply from the power source is started. The voltage before conversion in the rectifier circuit 62 is 240 V and the voltage after the conversion is 340 V.

Then, from time T2, actuation of the motors 251 to 281 is started.

Then, from time T3 when the voltage of the regenerative capacitor 63 becomes equal to or larger than the first threshold, the comparator 91 turns on the switch 66A. Thereby, the first state shown in FIG. 5 is set. Therefore, even when the capacity of the regenerative capacitor 63 becomes full, the voltage is applied to the regenerative resistor 65A and the regenerative resistor 65A generates heat and is discharged.

Then, at time T4 when the voltage of the regenerative capacitor 63 becomes 340 V at normal times, the comparator 91 turns off the switch 66A. Thereby, the state is returned to the normal state shown in FIG. 4.

Then, from time T5 when the voltage of the regenerative capacitor 63 becomes equal to or larger than the first threshold, the comparator 91 turns on the switch 66A. Thereby, the first state shown in FIG. 5 is set.

Then, from time T6 when the voltage of the regenerative resistor 65B becomes equal to or larger than the second threshold, the comparator 92 turns on the switch 66B. Thereby, the second state shown in FIG. 6 is set. Therefore, the voltage is applied to the regenerative resistor 65A and the regenerative resistor 65B and the regenerative resistor 65A and the regenerative resistor 65B generate heat and are discharged.

As above, the motor drive circuit for a robot and the robot system according to the present disclosure are explained based on the illustrated embodiments, however, the present disclosure is not limited to those. The configurations of the respective parts may be replaced by any configurations having the same functions. Further, any other configuration may be added.

In the above described embodiments, the number of rotation axes of the robot arm is three, however, the present disclosure is not limited to that. The number of rotation axes of the robot arm may be e.g. two, four, or more. That is, in the above described embodiments, the number of arms is three, however, the present disclosure is not limited to that. The number of arms may be e.g. two, four, or more.

What is claimed is:

1. A motor drive circuit for a robot comprising:
   an input terminal coupled to a power supply, to which power from the power supply is input;
   an output terminal outputting the power to a motor actuating the robot arm;
   a regenerative capacitor placed between the input terminal and the output terminal and storing regenerative power from the motor;
   a first resistor provided in parallel to the regenerative capacitor;
   a second resistor provided in parallel to the first resistor;
   a detection unit detecting a voltage applied to the regenerative capacitor and a voltage applied to the first resistor; and
   a switching unit switching among a normal state in which the regenerative power is supplied to the regenerative capacitor, a first state in which a voltage is applied to the first resistor, and a second state in which a voltage is applied to the first resistor and the second resistor based on a detection result of the detection unit, wherein
   the switching unit switches to the first state when the voltage applied to the regenerative capacitor detected in the detection unit is equal to or larger than a first threshold in the normal state, and switches to the second state when the voltage applied to the first resistor is equal to or larger than a second threshold larger than the first threshold in the first state.

2. The motor drive circuit for a robot according to claim 1, wherein
   the regenerative capacitor is coupled between the input terminal and the first resistor.

3. The motor drive circuit for a robot according to claim 1, wherein
   the second resistor is coupled between the first resistor and the output terminal.

4. The motor drive circuit for a robot according to claim 1, wherein
   the detection unit detects a voltage of the input terminal.

5. The motor drive circuit for a robot according to claim 1, wherein
   a resistance value of the first resistor and a resistance value of the second resistor are the same.

6. The motor drive circuit for a robot according to claim 1, wherein
   a resistance value of the second resistor is smaller than a resistance value of the first resistor.

7. A robot system comprising:
   a robot arm;
   a motor driving the robot arm; and
   a motor drive circuit for a robot supplying power to the motor,
   the motor drive circuit for a robot including
   an input terminal coupled to a power supply, to which power from the power supply is input,
   an output terminal outputting the power to a motor actuating the robot arm,
   a regenerative capacitor placed between the input terminal and the output terminal and storing regenerative power from the motor,
   a first resistor provided in parallel to the regenerative capacitor,
   a second resistor provided in parallel to the first resistor,
   a detection unit detecting a voltage applied to the regenerative capacitor and a voltage applied to the first resistor, and
   a switching unit switching among a normal state in which the regenerative power is supplied to the regenerative capacitor, a first state in which a voltage is applied to the first resistor, and a second state in which a voltage is applied to the first resistor and the second resistor based on a detection result of the detection unit, wherein the switching unit switches to the first state when the voltage applied to the regenerative capacitor detected in the detection unit is equal to or larger than a first threshold in the normal state, and switches to the second state when the voltage applied to the first resistor is equal to or larger than a second threshold larger than the first threshold in the first state.

* * * * *